July 15, 1930. P. E. FENTON 1,770,893
RESILIENT SCREW STUD
Filed Sept. 24, 1928
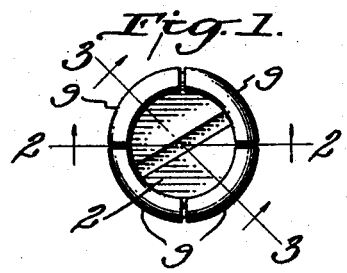
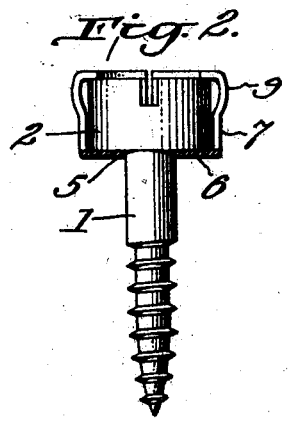
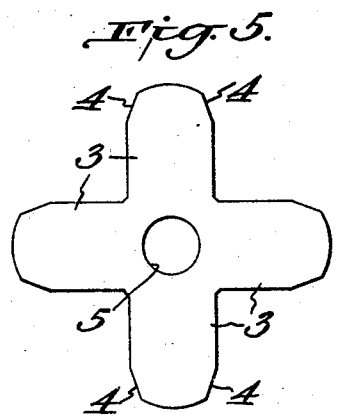
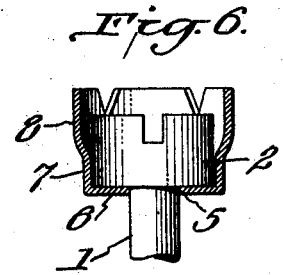
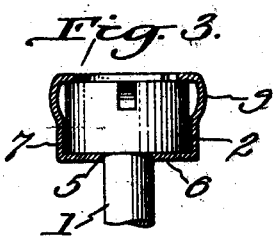
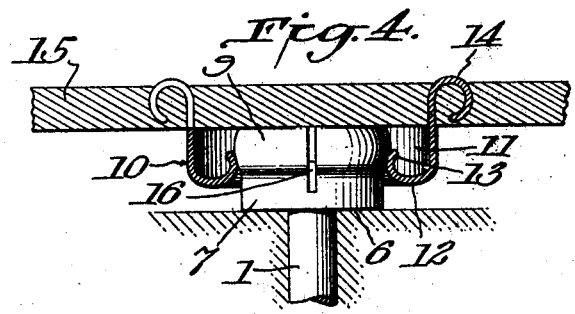
Inventor:
Paul E. Fenton
by
Wm H Finerel
Attorney Patented July 15, 1930

1,770,893

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

RESILIENT SCREW STUD

Application filed September 24, 1928. Serial No. 308,039.

The object of this invention is to provide a screw stud, having an applied resilient shell, to function as the resilient member of a snap fastener, the complemental rigid or non-resilient socket member being of any usual or approved construction.

The invention consists of a cap screw, threaded for use in wood or metal, the head of which has attached to it a shell, made resilient for purposes of engagement with or disengagement from an appropriate socket member, as I will proceed now to explain more fully and finally claim.

In the accompanying drawings illustrating the invention, in the several figures of which like parts are similarly designated, Figure 1 is a top plan, and Fig. 2 is a side elevation, the shell in this last mentioned view being shown in cross section on the line 2—2 of Fig. 1. Fig. 3 is a fragmentary side elevation, the shell being in cross section taken on the line 3—3 of Fig. 1. Fig. 4 is an elevation of the resilient end of this screw engaged with one form of socket, such as used on rugs or carpets for automobiles and elsewhere, the socket being shown in section. Fig. 5 is a plan view of a blank from which the resilient shell may be formed. Fig. 6 shows the upper portion of a cap screw and a cross section of the shell in position to be closed in over the top of the head of the screw.

The screw 1 may have its threaded end formed for use in connection with a wooden support, or this threaded end may be made for use with a metallic support. The screw is provided with a cylindrical nickel head 2 of any usual or approved construction.

To the head 2 is applied the resilient shell of this invention. One mode of manufacturing the shell is to form a blank, Fig. 5, having four, more or less, wings 3 having arcuate tips or ends, between which and the body of the wings are the beveled portions 4. The blank is provided with a central hole 5. The blank is bent to the shape shown in Fig. 6, with a base 6 containing the hole 5, and the wings 3 are upturned at right angles to the base 6 and formed with the parts 7 which fit, more or less closely, the head of the screw, with the wings bulged outwardly, as shown at 8, and finally the tips are bent over and downward upon the top of the head of the screw, with their under and outer faces flat in a plane parallel to said top, as shown in Figs. 1, 2 and 3. This leaves the finished bulge 9, Figs. 2, 3 and 4, standing slightly off from the head of the screw, and as the adjacent edges of the wings are in open contact as are also the bent over tips of the wings, and as the portions of the wings between the base 6 and the tips are bulged outwardly as explained, the shell has a resiliency sufficient to permit the engagement of a rigid or non-resilient socket 10, Fig. 4, of sufficient tenacity to hold the stud and socket in firm engagement, while at the same time admitting of disengagement without undue strain.

There is enough clearance between the head of the screw and the shell to permit the resilient movement of the wings of the shell for engaging or disengaging operations.

As will be seen, the tips of the wings of the shell overlie the head of the screw, thus giving the nicked portion of the screw a level below the outside level of the wings of the shell. In this respect the present invention is a variation of the invention forming the subject of my concurrent application filed September 24, 1928, Serial No. 308,040 (Patent No. 1,756,186, granted April 29, 1930).

As already stated, the stud is capable of use with a number of different kinds of sockets. The socket 10, shown in Fig. 4, is of ring form, having the flange 11 with its bottom turned inwardly, as at 12, and terminating in a reverted curved stud-engaging portion 13; the flange 11 being provided with a number of prongs 14 which may be driven into a carpet, rug or other support 15, and clinched therein, substantially as shown in Fig. 4.

The spaces formed by and between the adjacent edges of the wings of the shell may extend to the bottom portion 6, as shown in Fig. 2, or they may be shorter, as indicated at 16, Fig. 4.

The screw in this invention is of a conventional type, and over the head of the screw the shell is closed in a sliding contact, the walls of this shell having been broken or separated in any number of predetermined places, to allow for the contraction and expansion necessary for engaging and disengaging a non-resilient type of socket. The diameter of the head of the screw, is slightly smaller than the diameter of the inside of the shell, and this allows for contraction of the shell in uniting with the socket and also in disengagement therefrom.

Variations in the details of construction are permissible within the principle of the invention and the scope of the claims following.

What I claim is:—

1. A resilient screw stud, comprising a screw having a cylindrical head and a shank, and a shell provided with a base in which is a hole to engage the shank said base underlying the head of the screw and upstanding wings having their tips bent over the top of the head and in sliding engagement therewith, said tips having their under and outer faces flat in a plane parallel to said top, there being sufficient clearance between the head of the screw and the surrounding shell to permit resilient action of the wings.

2. A resilient screw stud, comprising a screw having a cylindrical head and a shank, and a shell provided with a base in which is a hole to engage the shank said base underlying the head of the screw and upstanding wings having their tips bent over the top of the head and in sliding engagement therewith, said tips having their under and outer faces flat in a plane parallel to said top, there being sufficient clearance between the head of the screw and the surrounding shell to permit resilient action of the wings, the upper portions of the wings being bulged outwardly, the wings being resilient.

In testimony whereof I have hereunto set my hand this 21st day of September, A. D. 1928.

PAUL E. FENTON.